US012790664B2

(12) United States Patent
Jung et al.

(10) Patent No.: US 12,790,664 B2
(45) Date of Patent: Nov. 10, 2026

(54) METHOD FOR EXTRACTING LITHIUM FROM CATHODE ACTIVE MATERIALS IN SPENT LITHIUM-ION BATTERIES USING NEUTRAL AQUEOUS SOLUTION AND METHOD FOR SELECTIVELY EXTRACTING LITHIUM FROM CATHODE ACTIVE MATERIALS IN SPENT LITHIUM-ION BATTERIES USING CARBONATED WATER

(71) Applicant: CHANGWON NATIONAL UNIVERSITY INDUSTRY ACADEMY COOPERATION CORPS, Changwon-si (KR)

(72) Inventors: Haesung Jung, Changwon-si (KR); Seongryeong Kim, Changwon-si (KR)

(73) Assignee: CHANGWON NATIONAL UNIVERSITY INDUSTRY ACADEMY COOPERATION CORPS, Changwon-si (KR)

( * ) Notice: Subject to any disclaimer, the term of this patent is extended or adjusted under 35 U.S.C. 154(b) by 392 days.

(21) Appl. No.: 18/422,074

(22) Filed: Jan. 25, 2024

(65) Prior Publication Data

US 2024/0240284 A1 Jul. 18, 2024

Related U.S. Application Data

(63) Continuation of application No. PCT/KR2023/020944, filed on Dec. 19, 2023.

(30) Foreign Application Priority Data

Jan. 12, 2023 (KR) ........................ 10-2023-0005537
Nov. 24, 2023 (KR) ........................ 10-2023-0165130

(51) Int. Cl.
*C22B 26/12* (2006.01)
*C22B 1/00* (2006.01)
(Continued)

(52) U.S. Cl.
CPC .............. *C22B 26/12* (2013.01); *C22B 1/005* (2013.01); *C22B 3/04* (2013.01); *H01M 10/54* (2013.01)

(58) Field of Classification Search
CPC ........... C22B 26/12; C22B 1/005; C22B 3/04; H01M 10/54; Y02W 30/84
See application file for complete search history.

(56) References Cited

FOREIGN PATENT DOCUMENTS

CN 106340692 A * 1/2017 ............ H01M 10/54
CN 110791652 A * 2/2020 ............. C22B 47/00
(Continued)

OTHER PUBLICATIONS

Hu Jingping, et.al. [CN110791652A] (machine translation) (Year: 2020).*
(Continued)

*Primary Examiner* — Danielle M. Carda
*Assistant Examiner* — Nazmun Nahar Shams
(74) *Attorney, Agent, or Firm* — NKL LAW; Jae Youn Kim

(57) ABSTRACT

The present disclosure relates to relates to a method for extracting lithium from cathode active materials in spent lithium-ion batteries using a neutral aqueous solution and a method for selectively extracting lithium from cathode active materials in spent lithium-ion batteries using a carbonated water. In particular, the method for extracting lithium from cathode active materials of spent lithium-ion batteries includes steps of: grinding the cathode active materials of spent lithium-ion batteries through a ball milling process; preparing a neutral aqueous solution and mixing
(Continued)

ground cathode active materials into the neutral aqueous solution; and generating lithium ions extracted from the neutral aqueous solution.

11 Claims, 12 Drawing Sheets

(51) Int. Cl.
*C22B 3/04* (2006.01)
*H01M 10/54* (2006.01)

(56) References Cited

FOREIGN PATENT DOCUMENTS

| | | | | | |
|---|---|---|---|---|---|
| CN | 113684374 | A | * | 11/2021 | ............ H01M 10/54 |
| EP | 3663262 | A1 | * | 6/2020 | ............... B09B 3/70 |
| JP | 2021174676 | A | * | 11/2021 | |
| JP | 6996723 | B1 | | 1/2022 | |
| JP | 7040196 | B2 | | 3/2022 | |
| JP | 7253538 | B2 | | 4/2023 | |
| JP | 2023-103941 | A | | 7/2023 | |
| KR | 101149762 | B1 | | 10/2011 | |
| KR | 1020120094622 | A | | 8/2012 | |
| KR | 10-2372248 | B1 | | 3/2022 | |
| KR | 1020230070677 | A | | 5/2023 | |

OTHER PUBLICATIONS

Yanagawa Yukitake [JP2021174676A] (machine translation) (Year: 2021).*

Takehiko Tsuruta ["Removal and Recovery of Lithium Using Various Microorganisms", Journal of Bioscience and Bioengineering vol. 100, No. 5, 562-566. 2005] (Takehiko, hereafter). (Year: 2005).*

Ramon J. Seidler et.al. ["Isolation and Characterization of Host-Independent Bdellovibrios", Journal of Bacteriology, Nov. 1969, p. 769-785] (Year: 1969).*

Zhang Yang et.al. [CN106340692A] (machine translation) (Year: 2017).*

Li Bo et.al. [CN113684374A] (machine translation) (Year: 2021).*

* cited by examiner

METHOD FOR EXTRACTING LITHIUM FROM CATHODE ACTIVE MATERIALS IN SPENT LITHIUM-ION BATTERIES USING NEUTRAL AQUEOUS SOLUTION AND METHOD FOR SELECTIVELY EXTRACTING LITHIUM FROM CATHODE ACTIVE MATERIALS IN SPENT LITHIUM-ION BATTERIES USING CARBONATED WATER

CROSS-REFERENCE TO RELATED APPLICATIONS

This application is a continuation application of International Patent Application No. PCT/KR2023/020944, filed on Dec. 19, 2023, which claims priority to KR 10-2023-0165130, filed Nov. 24, 2023, and KR 10-2023-0005537, filed Jan. 12, 2023, the contents of which are incorporated herein by reference in their entirety.

BACKGROUND

Technical Field

The present disclosure relates to a method for extracting lithium from cathode active materials in spent lithium-ions using a neutral aqueous solution and a method for selectively extracting lithium from cathode active materials in spent lithium-ion batteries using carbonated water.

Related Art

In general, lithium-ion batteries, which are also known as secondary batteries, have a high operating voltage, consequently having excellent charge-discharge cycling and being capable of miniaturization. Therefore, the demand for lithium-ions has exploded, not only as a power source for telecommunications and electronic devices, but also for portable power tools and other devices, with the recent commercialization of electric vehicles. As a result, the problem of battery disposal has become a major issue.

The generation of spent batteries comes from defective batteries produced in the battery manufacturing process and batteries that have reached the end of their life after a certain period of use. Spent batteries can be classified into two types: primary batteries such as manganese batteries, alkaline manganese batteries, silver oxide batteries, and mercury batteries; and secondary batteries such as nickel-cadmium batteries and lithium-ion batteries.

Lithium-ion batteries, which are mainly used as a power source for mobile phones and laptops, generate about 45 million units and 3,000 tons of spent batteries per year.

Until a few years ago, recovered spent secondary batteries were mainly incinerated or landfilled. However, as the price of precious metals such as nickel and cobalt, many engineers became interested in the recovery of theses metals and focused on technology development.

In terms of the conventional recycling technologies for spent secondary batteries, after collecting and storing batteries from battery crushing and grinding companies, they are physically ground to separate the surface metal from the internal electrodes. Smelting process is used to recover or extract the precious metals using separate methods.

The smelting process of precious metals is widely classified into pyrometallurgical and hydrometallurgical processes. The pyrometallurgical process involves grinding and concentrating ores to increase the grade of precious metals desired to be extracted, and then melting the ores with the combustion heat of coke, coal, etc., or electrical energy and reducing them into carbon components to extract precious metals. The most representative example of pyrometallurgy is the blast furnace smelting of iron ore. Unlikely the pyrometallurgical process, which relies on heat energy, the hydrometallurgical process involves dissolving concentrate metal compounds with chemical reagents such as sulfuric, hydrochloric, and nitric acids, then adding a reducing agent or a substitute to the solution to participate dissolved metals and extract them, and then electrolyzing extracted metals to refine them to a high purity.

The hydrometallurgical process has technical and economic challenges in the smelting large quantities of ores, and is thus applied to the smelting of small amounts of rare metals. In particular, since hydrometallurgy results in wastewater generation, environmental management is the most difficult problem.

Due to a large amount of excess acid in the leaching solution in conventional hydrometallurgical processes, large amounts of expensive neutralizing agents are needed to raise the pH in the purification and solvent extraction. This leads to environmental issues through wastewater generation.

Thus, most hydrometallurgical processes developed to date generate a large amount of wastewater during the smelting process, it is not easy to obtain permits for plant establishment due to the risk associated with handling chemical reagents, and corrosion accident s occur in metal equipment, resulting in increased maintenance costs. Furthermore, the problem of increase in maintenance costs due to the complex processes of hydrometallurgy leads to significant economic disadvantages, which makes commercialization rare.

Ball milling is a process mainly used for the grinding or synthesis of materials. Furthermore, recently, ball milling, a fundamental technology, is employed in conjugation with hydrometallurgical processes in which strong acids are used for recovering cathode active materials in spent lithium-ion batteries, enhancing the efficiency of cathode active material decomposition. All ball milling processes that have been attempted in the development of spent cathode active material decomposition technology so far have been a method for extracting spent cathode active materials under strong acid conditions after the ball milling process.

DETAILED DESCRIPTION

Technical Problem

According to the embodiment of the present disclosure, it aims to provide a method for rapidly extracting only lithium ions from spent cathode materials obtained after ball milling process, using a neutral aqueous solution instead of strong acid conditions.

According to the embodiment of the present disclosure, it aims to provide a method for extracting lithium from cathode active materials in spent lithium-ion batteries using a neutral aqueous solution, which enables selective and rapid extraction of only lithium at room temperature in a neural pH aqueous solution without applying hydrometallurgy carried out under conditions of strong acid and high temperatures above 80 degrees centigrade as in prior art. Therefore, this method is more sustainable in terms of energy and environment impacts than prior art and enables the extraction of lithium with significantly faster extraction rates.

According to the embodiment of the present disclosure, it aims to provide a method for extracting lithium from cathode active materials in spent lithium-ion batteries using a neutral aqueous solution, which enables recovery of lithium ions (Li+), which are the most important elements to be recovered in the recycling of cathode active materials in spent batteries, in an energy- and environmentally-efficient manner through a ball milling pretreatment process.

Furthermore, according to the embodiment of the present disclosure, it aims to provide a method for extracting lithium from cathode active materials in spent lithium-ion batteries using a neutral aqueous solution, which enables extraction of Li+ into a neutral pH aqueous solution (DI water and the like) obtained from an ulter-pure water manufacturing device, with fast extraction rates when adding spent cathode active materials to the solution, even without increasing the temperature and under strong acid conditions to accelerate the reaction rate.

According to the embodiment of the present disclosure, it aims to provide a method for selectively extracting lithium from cathode active materials in spent lithium-ion batteries using carbonated water, which enables recovery of lithium ions (Li+), the most valuable element to be recovered in the recycling of cathode active materials in spent batteries, in an energy-efficient and environmentally-friendly manner through a ball milling pretreatment process.

According to the embodiment of the present disclosure, it aims to provide a method for selectively extracting lithium from cathode active materials in spent lithium-ion batteries using carbonated water, which enable selective recovery of lithium with fast extraction rates at room temperature in a carbonic acid solution without applying hydrometallurgy carried out under conditions of strong acid and high temperatures above 80 degrees centigrade as in prior art. Therefore, this method is more sustainable in terms of energy and environment impacts than prior art and enables the extraction of lithium with significantly faster extraction rates.

According to the embodiment of the present disclosure, it aims to provide a method for selectively extracting lithium from cathode active materials in spent lithium-ion batteries using carbonated water, which enables achieving high lithium extraction efficiency even at high pulp density or solid-to-liquid ratio when either adding cathode active materials to a carbonic acid solution (carbonated water) after a ball milling process or bubbling carbon dioxides in ultra-pure water.

Technical Solution

According to a first aspect of the present disclosure, it can be achieved by, as a method for extracting lithium from cathode active materials of spent lithium-ion batteries, a method for extracting lithium from cathode active materials in spent lithium-ion batteries using a neutral aqueous solution including steps of: grinding cathode active materials of spent lithium-ion batteries through a ball milling process; preparing a neutral aqueous solution, and then mixing ground cathode active materials with the neutral aqueous solution; and generating lithium ions extracted from the neutral aqueous solution.

This method is characterized by in that the cathode active materials are ground mechanically through a ball milling process in the ball milling step.

This method is characterized by in that the cathode active materials is ground by zirconia balls in the ball milling process.

This method is characterized by in that the average diameter of the zirconia balls is 0.5~5 mm.

This method is characterized by in that the neutral aqueous solution is ultra-pure water or a PYE solution.

This method is characterized by in that the mixing step is carried out at room temperature.

This method is characterized by in that a concentration of the ground cathode active materials in the neutral aqueous solution is 0.15~0.25 g/L, the average diameter of the zirconia balls is 2.5~3.5 mm when the neutral aqueous solution is ultra-pure water, and a lithium ion recovery rate is 80% or more immediately after the reaction in the mixing step.

This method is characterized by in that a concentration of the ground cathode active materials in the neutral aqueous solution is 0.15~0.25 g/L, the average diameter of the zirconia balls is 0.8~3.2 mm when the neutral aqueous solution is a PYE solution, and a lithium ion recovery rate is 70% or more immediately after the reaction in the mixing step.

This method is characterized by in that when a concentration of the ground cathode active materials in the neutral aqueous solution is 8~11 g/L, a lithium ion recovery rate is 50% or more after 30 minutes of the mixing step and a lithium ion recovery rate is 65% or more after 24 hours of the mixing step.

According to a second aspect of the present disclosure, it can be achieved by, as a method for extracting lithium from cathode active materials in spent lithium-ion batteries, a method for extracting lithium from cathode active materials in spent lithium-ion batteries using carbonated water including steps of: grinding cathode active materials of spent lithium-ion batteries through a ball milling process; preparing a carbonic acid solution, and then mixing ground cathode active materials with the carbonic acid solution; and extracting lithium ions in the carbonic acid solution.

According to a third aspect of the present disclosure, it can be achieved by, as a method for extracting lithium from cathode active materials in spent lithium-ion batteries, a method for extracting lithium from cathode active materials in spent lithium-ion batteries using carbonated water including steps of: grinding cathode active materials of spent lithium-ion batteries through a ball milling process; mixing ground cathode active material with an aqueous solution, and then bubbling carbon dioxides in the aqueous solution; and extracting lithium ions in the aqueous solution.

In the second and third aspect of the present disclosure, the methods are characterized in that the cathode active materials are ground mechanically through a ball milling process in the ball milling step.

In the second and third aspect of the present disclosure, the methods are characterized in that the cathode active materials are ground through zirconia balls in the ball milling process.

In the second and third aspect of the present disclosure, the methods are characterized in that a ratio of the cathode active materials to the zirconia balls is in the range of 1:5~35.

In the second and third aspect of the present disclosure, the methods are characterized in that the average diameter of the zirconia balls is 0.5~7 mm.

In the second and third aspect of the present disclosure, the methods are characterized in that a concentration of the ground cathode active materials is 10~100 g/L.

In the second aspect of the present disclosure, the method is characterized in that the carbonic acid solution is 0.1~2M $NaHCO_3$.

In the third aspect of the present disclosure, the method is characterized in that the method is characterized in that the aqueous solution is ultra-pure water (DI).

In the second aspect of the present disclosure, the method is characterized in that a recovery rate is about 100% in the extracting step.

In the third aspect of the present disclosure, the method is characterized in that a recovery rate is about 80% in the extracting step.

Advantageous Effects

According to the embodiment of the present disclosure, it is capable of providing a method for rapidly extracting only lithium ions from spent cathode materials obtained after ball milling process, using a neutral aqueous solution instead of strong acid conditions.

According to the method for extracting lithium from cathode active materials in spent lithium-ions using a neutral aqueous solution in accordance with the embodiment of the present disclosure, it is capable of selective and rapid extraction of only lithium at room temperature in a neural pH aqueous solution without applying hydrometallurgy carried out under conditions of strong acid and high temperatures above 80 degrees centigrade as in prior art. Therefore, this method is more sustainable in terms of energy and environment impacts than prior art and enables the extraction of lithium with significantly faster extraction rates.

According to the method for extracting lithium from cathode active materials in spent lithium-ions using a neutral aqueous solution in accordance with the embodiment of the present disclosure, it is capable of recovery of lithium ions (Li+), which are the most important elements to be recovered in the recycling of cathode active materials in spent batteries, in an energy- and environmentally-efficient manner through a ball milling pretreatment process.

According to the method for extracting lithium from cathode active materials in spent lithium-ions using a neutral aqueous solution in accordance with the embodiment of the present disclosure, it is capable of extraction of Li+ into a neutral pH aqueous solution (DI water and the like) obtained from an ulter-pure water manufacturing device, with fast extraction rates when adding spent cathode active materials to the solution, even without increasing the temperature and under strong acid conditions to accelerate the reaction rate.

According to a method for selectively extracting lithium from cathode active materials in spent lithium-ion batteries using carbonated water in accordance with the embodiment of the present disclosure, it is capable of recovery of lithium ions (Li+), the most valuable element to be recovered in the recycling of cathode active materials in spent batteries, in an energy-efficient and environmentally-friendly manner through a ball milling pretreatment process.

According to a method for selectively extracting lithium from cathode active materials in spent lithium-ion batteries using carbonated water in accordance with the embodiment of the present disclosure, it is capable of selective recovery of lithium with fast extraction rates at room temperature in a carbonic acid solution without applying hydrometallurgy carried out under conditions of strong acid and high temperatures above 80 degrees centigrade as in prior art. Therefore, this method is more sustainable in terms of energy and environment impacts than prior art and enables the extraction of lithium with significantly faster extraction rates.

According to a method for selectively extracting lithium from cathode active materials in spent lithium-ion batteries using carbonated water in accordance with the embodiment of the present disclosure, it is capable of achieving high lithium extraction efficiency even at high pulp density or solid-to-liquid ratio when either adding cathode active materials to a carbonic acid solution (carbonated water) after a ball milling process or bubbling carbon dioxides in ultra-pure water.

BEST MODE

Hereinafter, a method for extracting lithium from cathode active materials in spent lithium-ion batteries using a neutral aqueous solution according to the present disclosure is described.

Figure 1:
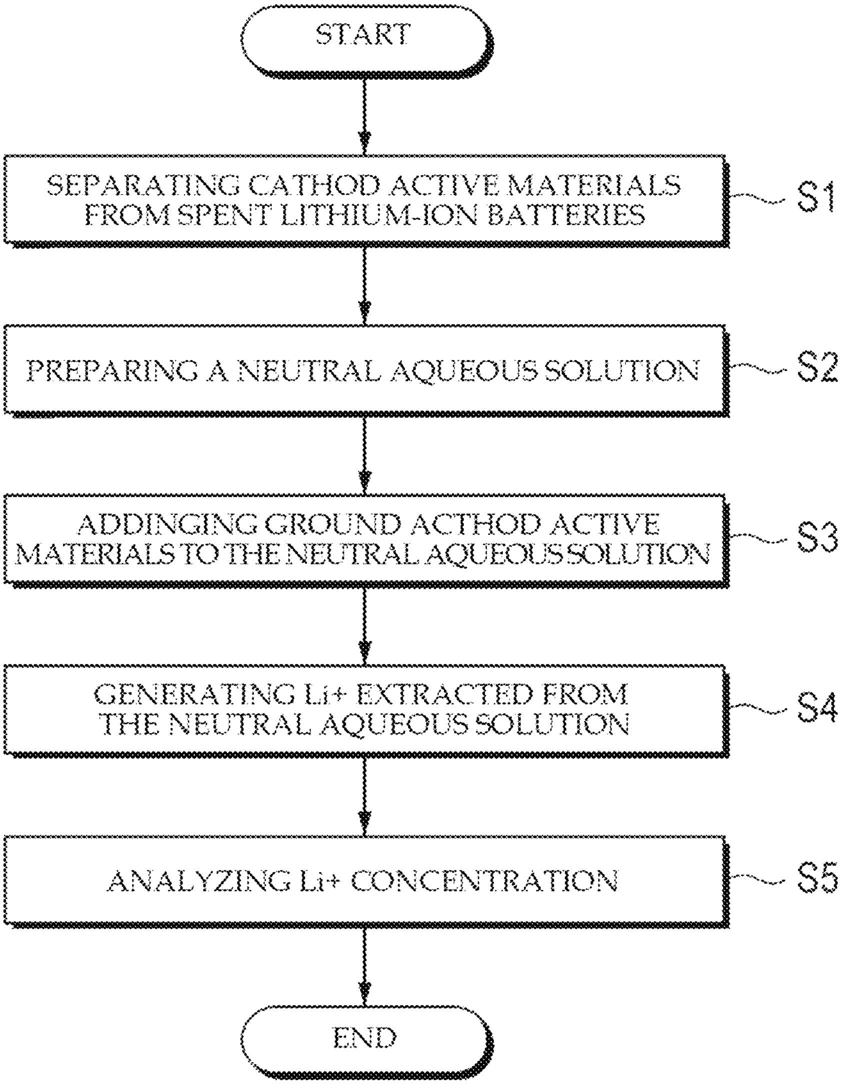
FIG. 1 is a flowchart of a method for extracting lithium from cathode active materials in spent lithium-ion batteries using a neutral aqueous solution according to the embodiment of the present disclosure.
Figure 2:
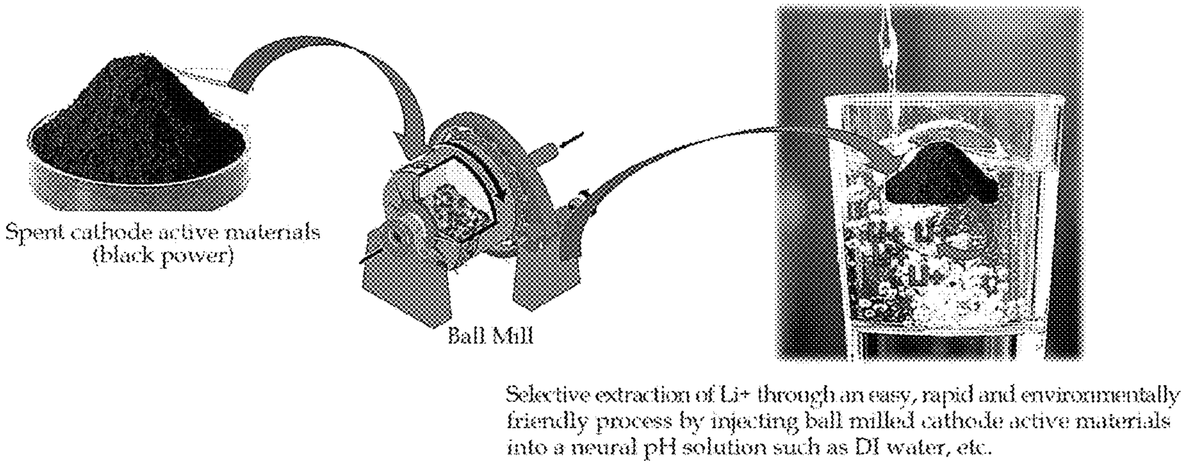
FIG. 2 is a schematic view of the method for extracting lithium from cathode active materials in spent lithium-ion batteries using a neutral aqueous solution according to the embodiment of the present disclosure.

FIG. 1 is a flowchart of a method for extracting lithium from cathode active materials in spent lithium-ion batteries using a neutral aqueous solution according to the embodiment of the present disclosure. FIG. 2 is a schematic view of the method for extracting lithium from cathode active materials in spent lithium-ion batteries using a neutral aqueous solution according to the embodiment of the present disclosure.

In the method for extracting lithium from cathode active materials in spent lithium-ion batteries using a neutral aqueous solution according to the present disclosure, firstly, cathode active materials of spent lithium-ion batteries are ground (S1).

The step of grinding cathode active materials may be carried out by a mechanical grinding method through a ball milling process. In this case, the cathode active materials may be ground using zirconia balls in the ball milling process, and the average diameter of the zirconia balls may be 0.5~5 mm.

Then, a neutral aqueous solution is prepared (S2), and ground cathode active materials are mixed with this neutral aqueous solution (S3). Lithium ions, which are extracted from the neutral aqueous solution immediately after mixing and reacting the neutral aqueous solution with the ground cathode active, are generated (S4).

The neutral aqueous solution according to the present disclosure may be ultra-pure water or a PYE solution that is a neutral solution used in bioleaching using microorganisms.

This mixing and reacting step is carried out at room temperature. That is, in the present disclosure, lithium ion extraction is not carried out at high temperatures above 80 degrees centigrade as in prior art. Therefore, according to the present disclosure, this method may be more sustainable in terms of energy and environment impacts than prior art and enable the extraction of lithium with significantly faster extraction rates.

Figure 3:
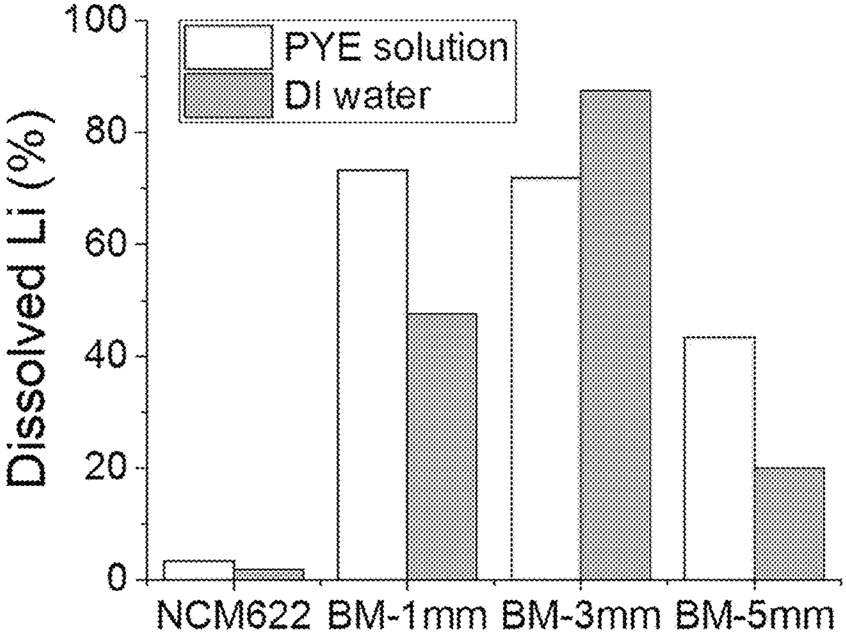
FIG. 3 is a graph of Li+ extraction concentrations from cathode active materials that have undergone ball milling in ultra-pure water and a PYE solution according to the first embodiment of the present disclosure.

Hereinafter, the first and second embodiments of the present disclosure are described in detail. FIG. 3 is a graph of Li+ extraction concentrations from cathode active materials that have undergone ball milling in ultra-pure water and a PYE solution according to the first embodiment of the present disclosure.

Cathode active materials of spent lithium-ion batteries and zirconia balls (average particle size of 1 mm, 3 mm, 5 mm) were loaded into a ball milling device together and then subjected to a mechanical grinding reaction.

Then, following ball milling, the obtained cathode active materials were added to ultra-pure water or a PYE solution. Li+ extracted from the aqueous solution simultaneously with adding the ball milled cathode active materials was generated. The concentration of Li+ was analyzed using an analyzing device such as ICP-OES (S5).

For the embodiments, test were carried out in ultra-pure water (DI water) and a neutral aqueous solution (PYE solution) used in bioleaching using microorganisms.

The prepared cathode active materials were added to the two neutral aqueous solutions (concentration of cathode active materials in solution, 0.2 g/L), and then subjected to solution sampling to measure Li+ using ICP-OES. It was confirmed that the extracted Li+ was detected from the ball milled cathode active materials in both of the solutions.

As shown in FIG. 3, particularly, it was confirmed that about 90% of lithium was extracted in ultra-pure water without heat treatment and strong acid conditions when the zirconia ball was 3 mm in diameter. In addition, it was confirmed that about 70% or more of lithium was extracted in PYE solution when the zirconia balls were 1 mm and 3 mm in diameter without heat treatment and strong acid conditions.

Figure 4:
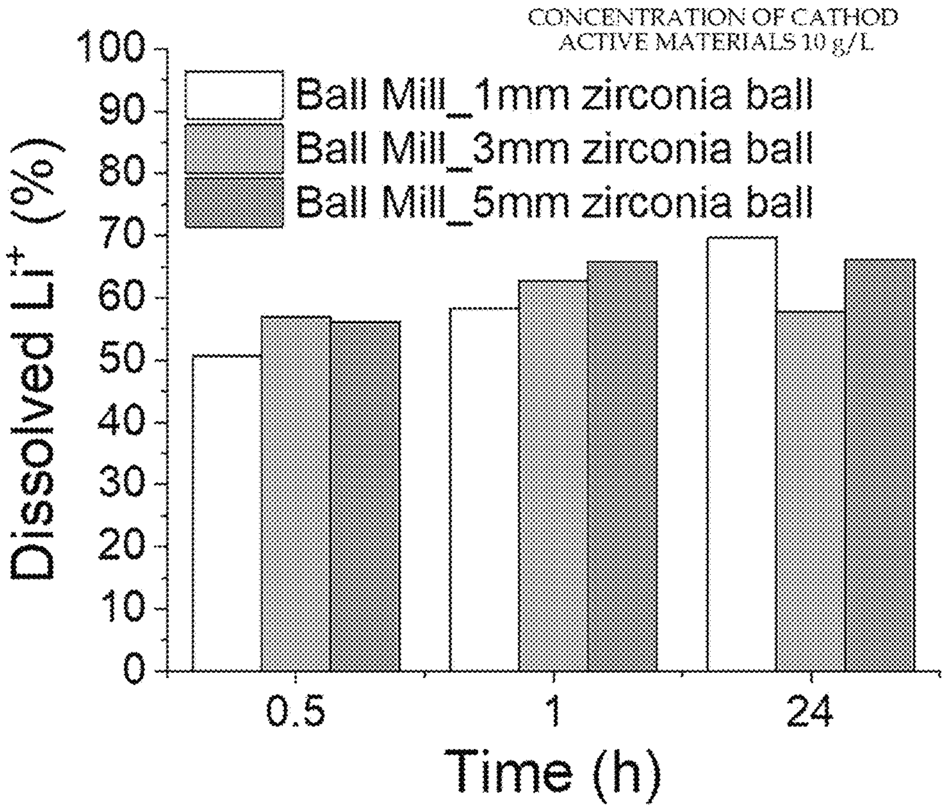
FIG. 4 is a graph of Li+ extraction concentrations from 10 g/L cathode active materials over time after ball milling in ultra-pure water according to the second embodiment of the present disclosure.

FIG. 4 is a graph of Li+ extraction concentrations from 10 g/L cathode active materials over time after ball milling in ultra-pure water according to the second embodiment of the present disclosure.

The second embodiment is essentially the same as the first embodiment, however, in the second embodiment, the concentration of cathode active materials was increases to 10 g/L to confirm the extraction of Li+ when the cathode active materials were added to the solution at a high concentration for practical applicability.

As shown in FIG. 4, it was confirmed that 50~60% of Li+ was extracted simultaneously with being added to ultra-pure water.

When the ball milled cathode active materials (concentration of 10 g/L) were added to ultra-pure water and the extraction of Li+ was checked over time, it was observed that the concentration of extracted Li+ gradually increased over time, and it was confirmed that it reached about 60~70% after one day.

Therefore, according to the embodiment of the present disclosure, it is seen that Li+ can be extracted quickly and easily by adding cathode active materials of spent lithium-ion batteries to neutral aqueous solutions such as ultra-pure water, a PYE solution after a ball milling process.

DESCRIPTION OF EMBODIMENTS

Hereinafter, a method for extracting lithium from cathode active materials in spent lithium-ion batteries using carbonated water is described.

Figure 5:
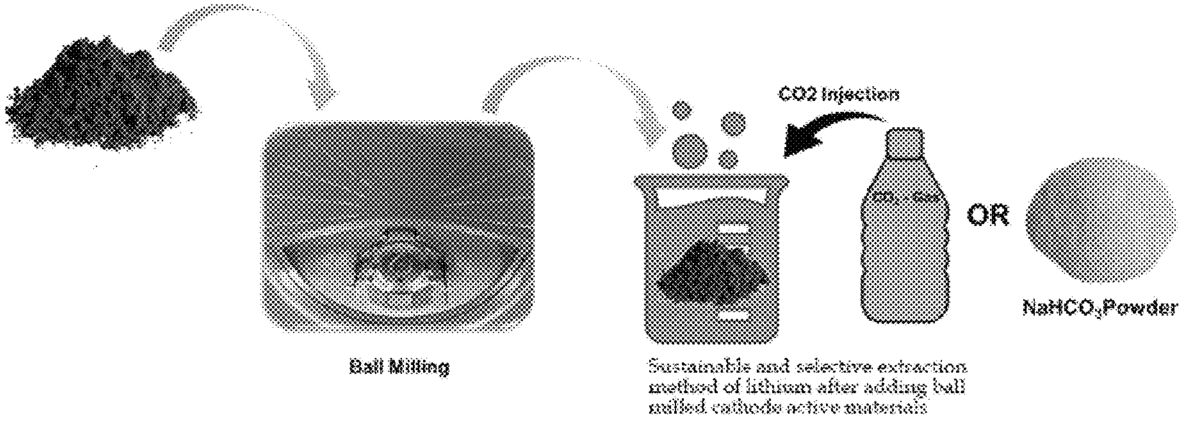
FIG. 5 is a flowchart of a method for selectively extracting lithium from cathode active materials in spent lithium-ion batteries using carbonated water according to the embodiment of the present disclosure.

FIG. 5 is a flowchart of a method for selectively extracting lithium from cathode active materials in spent lithium-ion batteries using carbonated water according to the embodiment of the present disclosure.

Firstly, cathode active materials of spent lithium-ion batteries are ground. In this grinding step, the cathode active materials are mechanically ground thorough a ball milling process. That is, the active materials are ground by using zirconia balls in the ball milling process.

In the embodiment of the present disclosure, a ratio of the cathode active materials to the zirconia balls is within a range of 1:5~35, and the average diameter of the zirconia balls is 0.5~7 mm.

In the embodiment of the present disclosure, a carbonic acid solution is prepared, then the ground active materials are mixed with the carbonic acid solution, and lithium ions are extracted from the carbonic acid solution.

Further, in another embodiment of the present disclosure, ground cathode active materials are mixed with an aqueous solution, then carbon dioxides are subjected to bubbling in the aqueous solution, and lithium ions can be extracted from the aqueous solution.

In the embodiment of the present disclosure, the concentration of the ground cathode active materials is 10~100 g/L.

Further, in the embodiment of the present disclosure, the carbonated acid solution may be 0.1~2M NaHCO3 and exhibit an about 100% recovery. In the bubbling according to another embodiment, lithium ions may be extracted by bubbling CO2 into ultra-pure water. In this case, a recovery rate of about 80% may be obtained.

Figure 6:
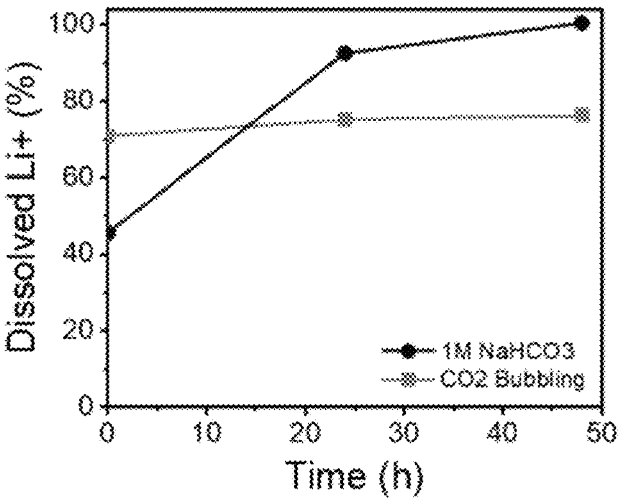
FIG. 6 is a graph of lithium ion extractions from cathode active materials that have undergone ball milling in 1M carbonic acid solution and CO2 bubbling, respectively according to the experimental example of the present disclosure.
Figure 7:
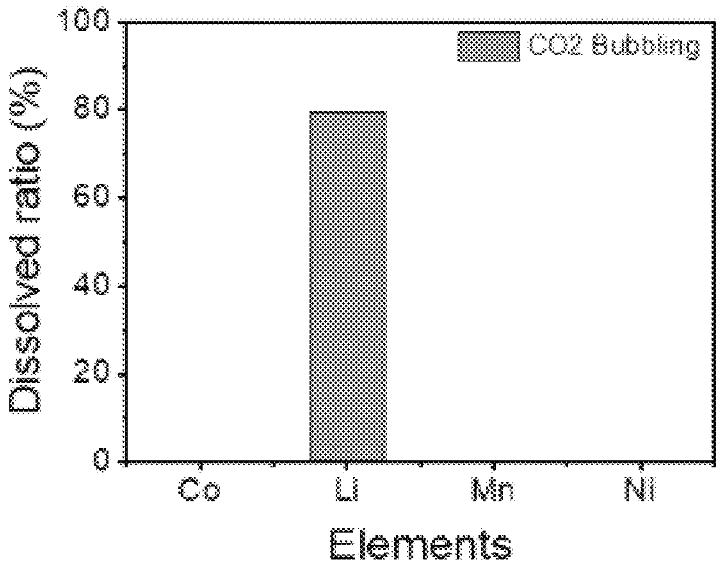
FIG. 7 and FIG. 8 are graphs of lithium ion extractions in 1M carbonic acid solution and CO2 bubbling, respectively, according to the experimental example of the present disclosure.
Figure 8:
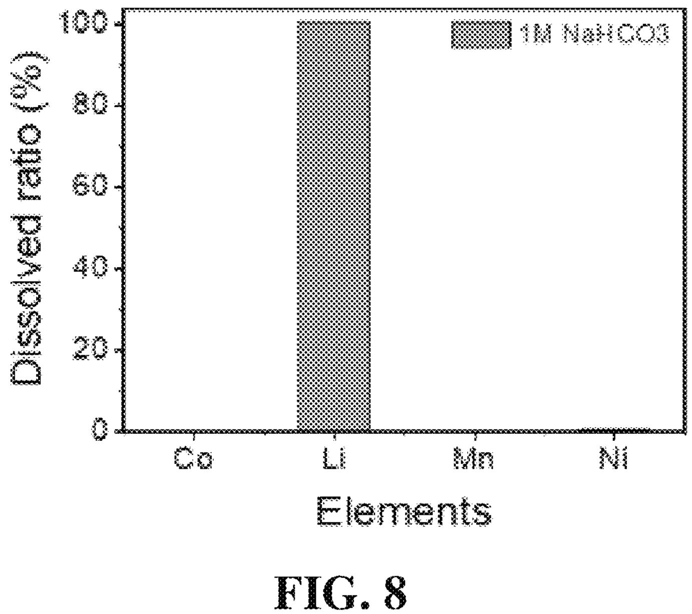

Hereinafter, the experimental example and data of the method for extracting lithium from cathode active materials in spent lithium-ion batteries using carbonated water according to the embodiment of the present disclosure are described. FIG. 6 is a graph of lithium ion extractions from cathode active materials that have undergone ball milling in 1M carbonic acid solution and CO2 bubbling, respectively according to the experimental example of the present disclosure. FIG. 7 and FIG. 8 are graphs of lithium ion extractions in 1M carbonic acid solution and CO2 bubbling, respectively, according to the experimental example of the present disclosure.

In the experimental example of the present disclosure, NCM622, a cathode active materials of lithium-ion batteries, and zirconia balls (1 mm, 3 mm, 5 mm) were loaded into a ball milling device and then mechanically ground.

A ratio of the cathode active materials to zirconia balls in the ball mill reaction was set within a range of 1:5~1:35.

Following ball milling, the obtained NCM622 was added to a carbonic acid solution and then subjected to extraction.

In this case, the carbonic acid solution refers to an aqueous solution by bubbling CO2 gas in ultra-pure water (DI water), and a solution containing carbonate ions (e.g., NaHCO3, etc.).

Li+ extracted from the aqueous solution simultaneously with adding the ball milled cathode active materials was generated. The concentration of Li+ was analyzed using an analyzing device such as ICP-OES (S5).

For the experimental example of the present disclosure, a method for extracting lithium by adding ball milled cathode active materials to ultra-pure water and simultaneously performing CO2 bubbling was performed. Additionally, a test was conducted by adding ball milled cathode active materials to 0.1~2M NaHCO3.

During CO2 bubbling for 3 hours, it was conformed that pH reached 7, and the initial pH of 1M NaHCO3 solution was 8 and its pH was maintained to 8~9 even after adding the ball milled cathode active materials.

The concentration of the cathode active materials in all solutions was set to 10~100 g/L, then solution sampling was performed for Li+ measurement using ICP-OES, and it was confirmed that extracted Li+ was detected from the ball milled cathode active materials.

In addition, it was confirmed that Co, Mn, and Ni in the cathode active materials were hardly extracted from the solution except for Li+, which is negligible.

Particularly, under the CO2 bubbling condition, it was confirmed that about 80% of lithium was extracted in carbonic acid solution without heat treatment and strong acid conditions when a zirconia ball is 5 mm in diameter. In addition, under the 1M NaHCO3 condition, it was confirmed that lithium was completely dissolved to 100% at a rapid rate.

Figure 9:
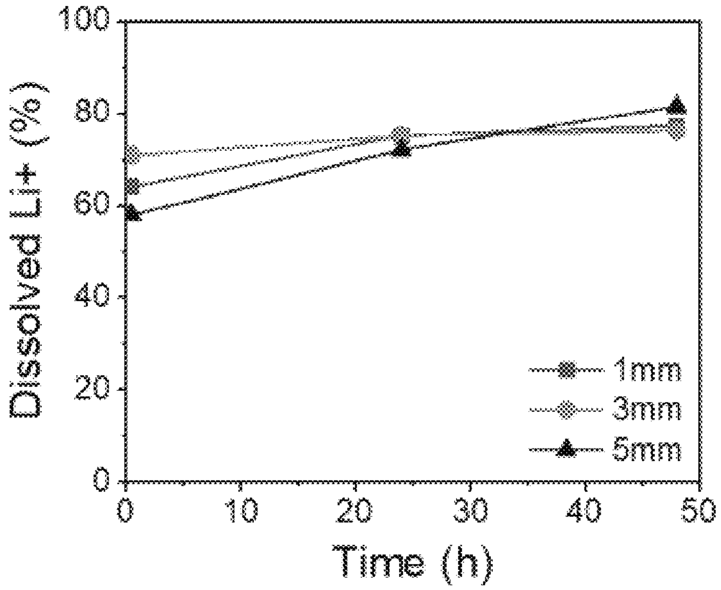
FIG. 9 is a graph of concentrations of Li+ that exists in solutions over sampling time when adding cathode active materials ball milled using 1 mm, 3 mm and 5 mm zirconia balls to 10 g/L CO2 bubbling according to the experimental example of the present disclosure.

FIG. 9 is a graph of concentrations of Li+ that exists in solutions over sampling time when adding cathode active materials ball milled using 1 mm, 3 mm and 5 mm zirconia balls to 10 g/L CO2 bubbling according to the experimental example of the present disclosure.

To confirm the extraction of Li+ when the cathode active materials were added to the solution at a high concentration for practical applicability, the ball milled cathode materials (concentration 50 g/L) were subjected to the CO2 bubbling. As a result, it was observed that the concentration of Li+ extracted gradually increased over time, and it was confirmed that it reached about 70% after 48 hours.

In the case of NaHO3, when the ball milled cathode active materials were added at a concentration of 100 g/L and lithium was extracted, it was confirmed that the lithium extraction rate reached about 50% after 48 hours.

Figure 10:
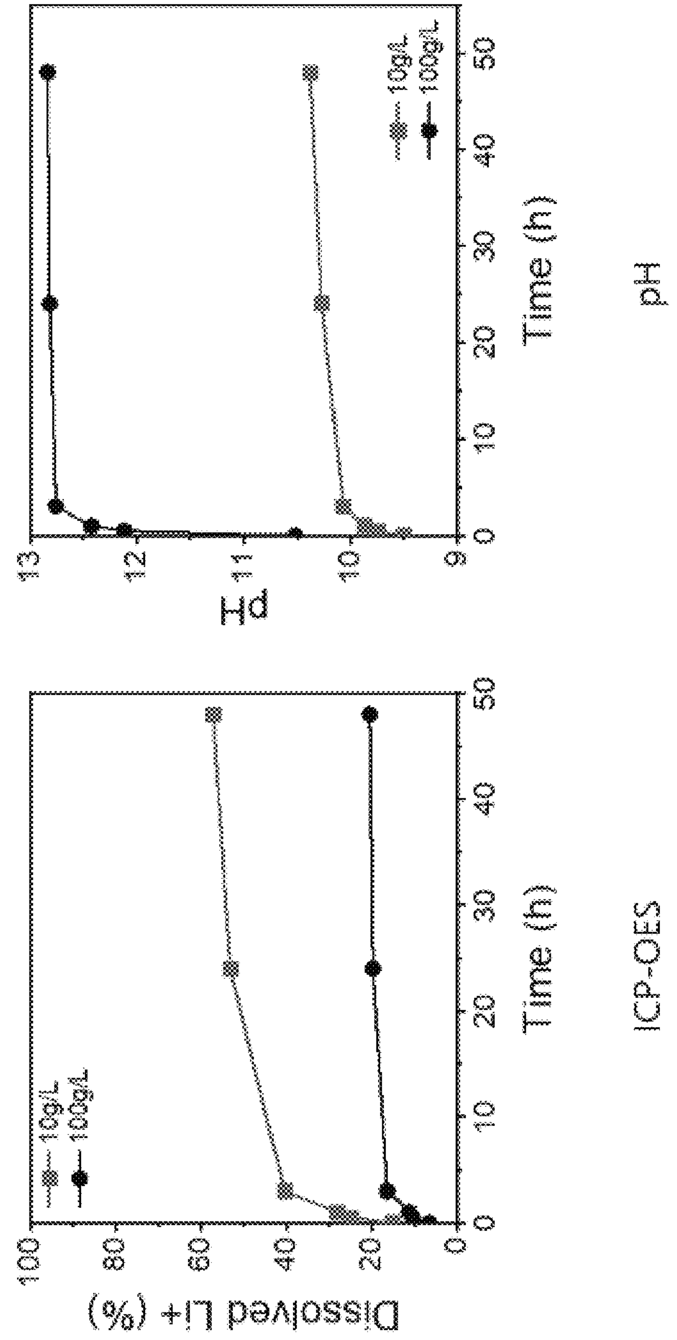
FIG. 10 shows graphs of lithium extraction recovery rates (extraction concentration) and pHs for each 10 g/L and 100 g/L cathode active materials in 100 mM NaHCO3 (500 rpm-3 mm-3 h, pH8) according to the experimental example of the present disclosure.

FIG. 10 shows graphs of lithium extraction recovery rates (extraction concentration) and pHs for each 10 g/L and 100 g/L cathode active materials in 100 mM NaHCO3 (500 rpm-3 mm-3 h, pH8) according to the experimental example of the present disclosure. As shown in FIG. 10, when the ratio of the cathode active materials to the zirconia balls was 1:5, it was seen that a recovery rate of about 40% for 10 g/L and about 20% for 100 g/L can be achieved within about 3 hours.

Figure 11:
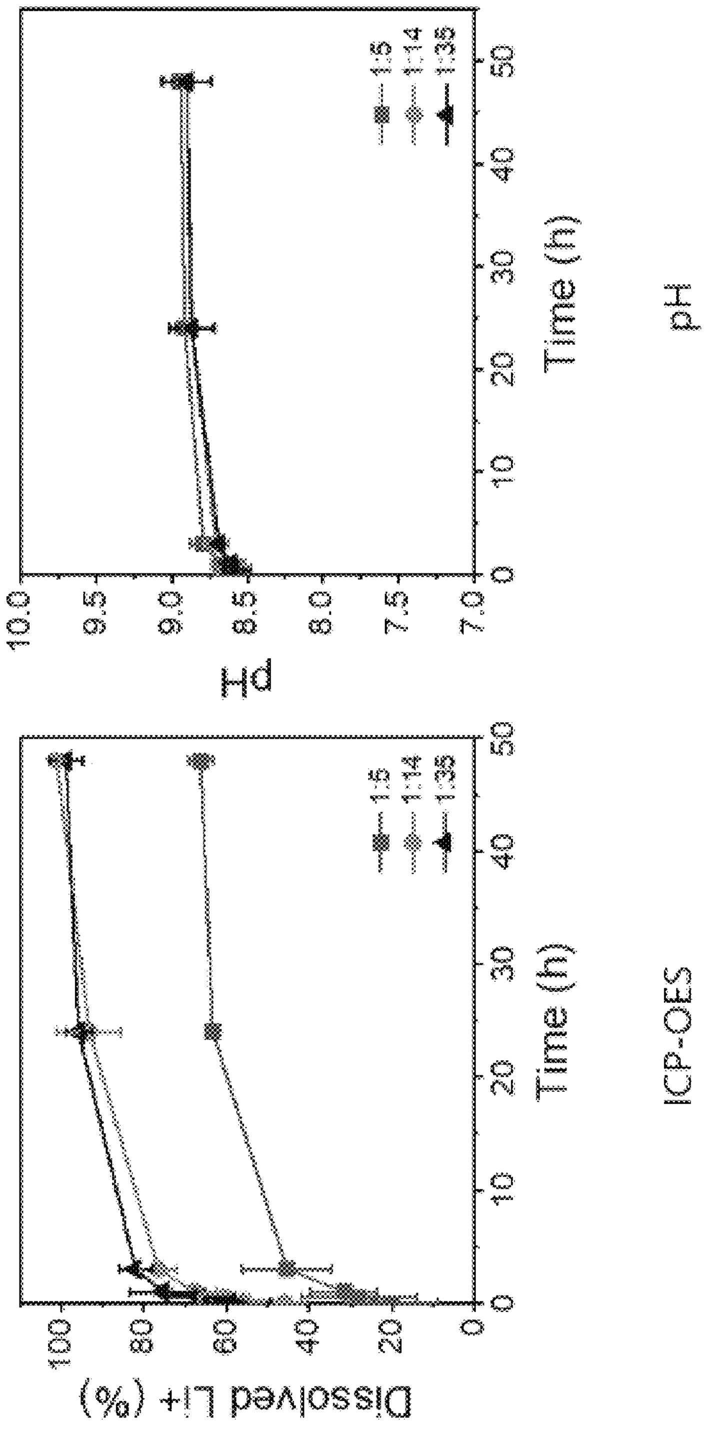
FIG. 11 shows graphs of lithium extraction recovery rates (extraction concentration) and pHs for each cathode active material and zirconia ball ratio, 1:5, 1:14 and 1:35 in 10 g/L cathode active materials, in 1M NaHCO3 (500 rpm-3 mm-3 h, pH8) according to the experimental example of the present disclosure.

FIG. 11 shows graphs of lithium extraction recovery rates (extraction concentration) and pHs for each cathode active material and zirconia ball ratio, 1:5, 1:14 and 1:35 in 10 g/L cathode active materials, in 1M NaHCO3 (500 rpm-3 mm-3 h, pH8) according to the experimental example of the present disclosure. As shown in FIG. 11, when the ratio of the cathode active materials to the zirconia balls was 1:14 and 1:35, it was seen that a recovery rate of about 80% can be achieved after about 2 hours.

Figure 12:
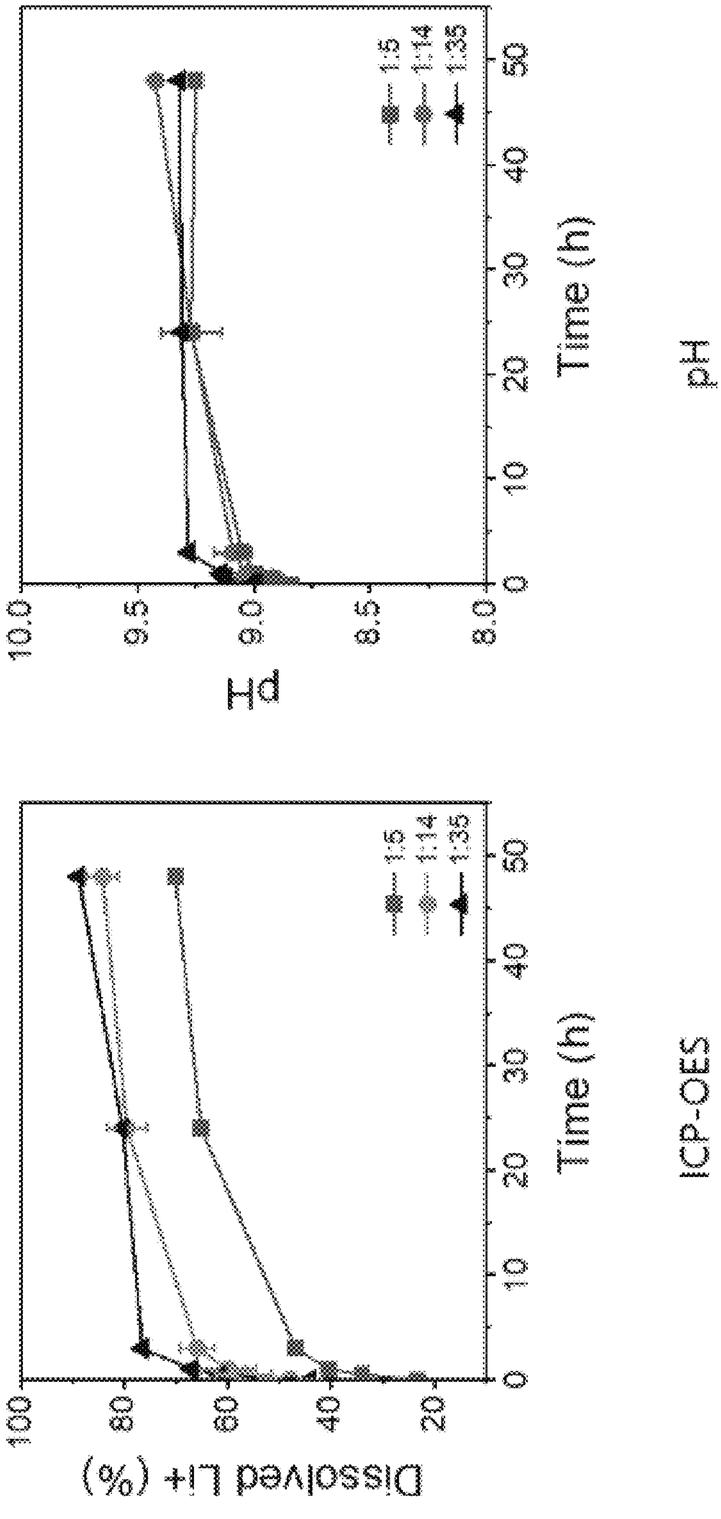
FIG. 12 shows graphs of lithium extraction recovery rates (extraction concentration) and pHs for each cathode active material and zirconia ball ratio, 1:5, 1:14 and 1:35 in 20 g/L cathode active materials, in 1M NaHCO3 (500 rpm-3 mm-3 h, pH8) according to the experimental example of the present disclosure.

FIG. 12 shows graphs of lithium extraction recovery rates (extraction concentration) and pHs for each cathode active material and zirconia ball ratio, 1:5, 1:14 and 1:35 in 20 g/L cathode active materials, in 1M NaHCO3 (500 rpm-3 mm-3 h, pH8) according to the experimental example of the present disclosure. As shown in FIG. 12, when the ratio of the cathode active materials to the zirconia balls was 1:14 and 1:35, it was seen that a recovery rate of about 60% can be achieved after about 2 hours.

Figure 13:
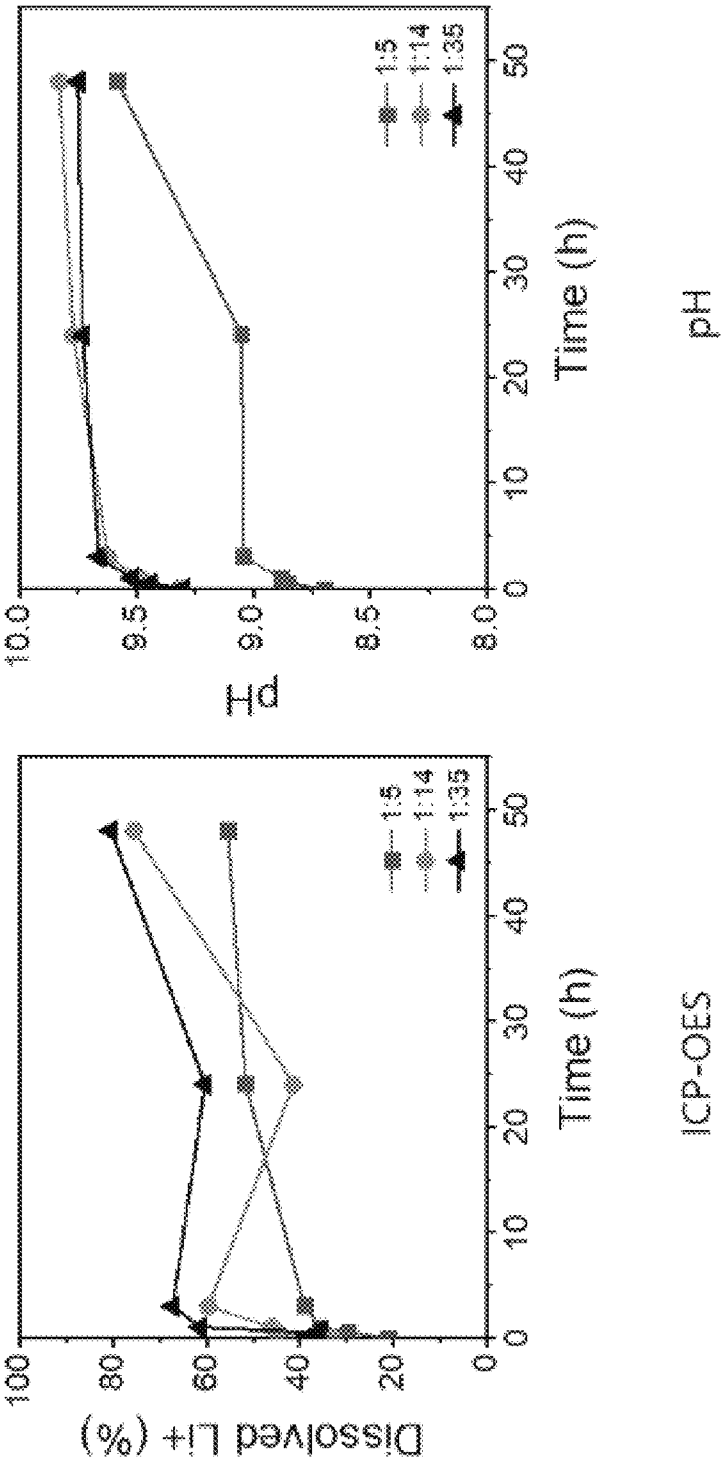
FIG. 13 shows graphs of lithium extraction recovery rates (extraction concentration) and pHs for each cathode active material and zirconia ball ratio, 1:5, 1:14 and 1:35 in 50 g/L cathode active materials, in 1M NaHCO3 (500 rpm-3 mm-3 h, pH8) according to the experimental example of the present disclosure.

FIG. 13 shows graphs of lithium extraction recovery rates (extraction concentration) and pHs for each cathode active material and zirconia ball ratio, 1:5, 1:14 and 1:35 in 50 g/L cathode active materials, in 1M NaHCO3 (500 rpm-3 mm-3 h, pH8) according to the experimental example of the present disclosure. As shown in FIG. 13, when the ratio of the cathode active materials to the zirconia balls was 1:14 and 1:35, it was seen that a recovery rate of about 60% can be achieved after about 2 hours.

Figure 14:
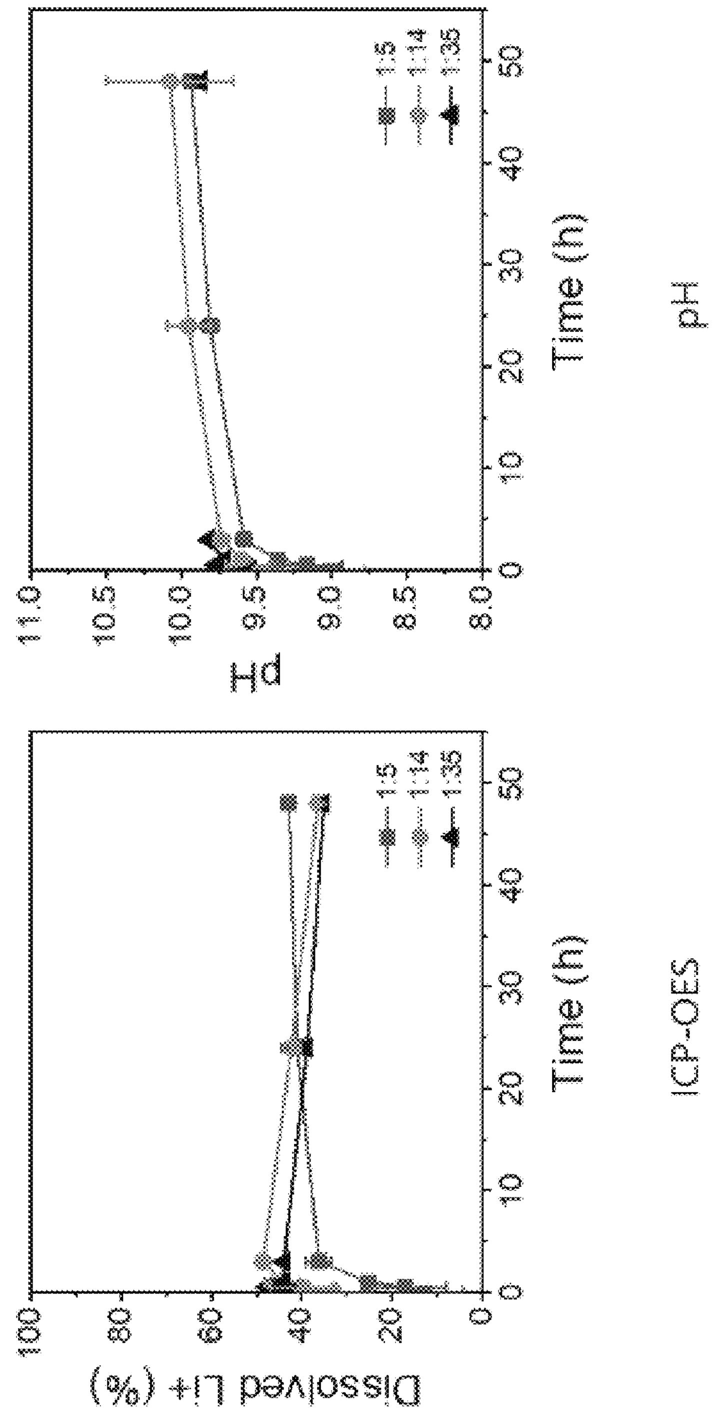
FIG. 14 shows graphs of lithium extraction recovery rates (extraction concentration) and pHs for each cathode active material and zirconia ball ratio, 1:5, 1:14 and 1:35 in 100 g/L cathode active materials, in 1M NaHCO3 (500 rpm-3 mm-3 h, pH8) according to the experimental example of the present disclosure.

FIG. 14 shows graphs of lithium extraction recovery rates (extraction concentration) and pHs for each cathode active material and zirconia ball ratio, 1:5, 1:14 and 1:35 in 100 g/L cathode active materials, in 1M NaHCO3 (500 rpm-3 mm-3 h, pH8) according to the experimental example of the present disclosure. As shown in FIG. 14, when the ratio of the cathode active materials to the zirconia balls was 1:14 and 1:35, it was seen that a recovery rate of about 50% can be achieved after about 2 hours.

Figure 15:
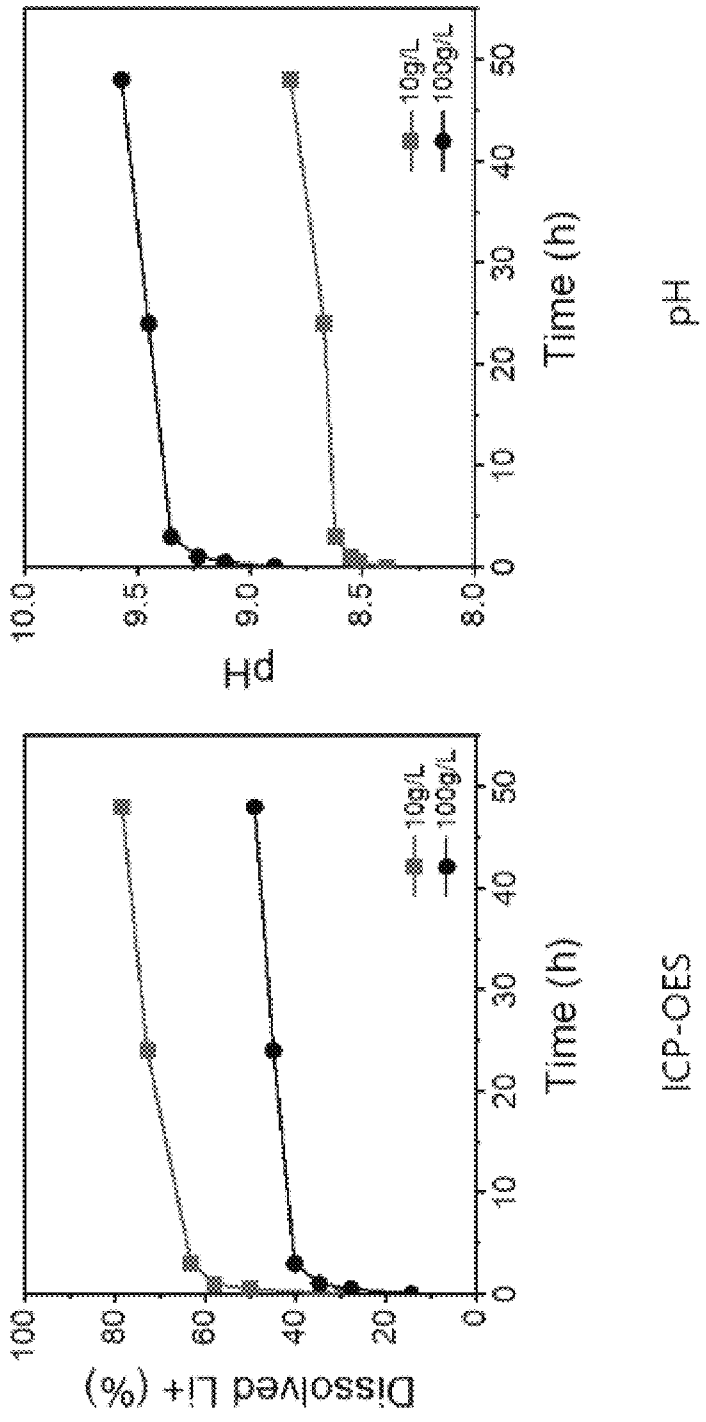
FIG. 15 shows graphs of lithium extraction recovery rates (extraction concentration) and pHs for each 10 g/L and 100 g/L cathode active materials when a cathode active material and zirconia ball ratio is 1:5, in 2M NaHCO3(600 rpm-3 mm-3 h, pH8) according to the experimental example of the present disclosure.

FIG. 15 shows graphs of lithium extraction recovery rates (extraction concentration) and pHs for each 10 g/L and 100 g/L cathode active materials when a cathode active material and zirconia ball ratio is 1:5, in 2M NaHCO3(600 rpm-3 mm-3 h, pH8) according to the experimental example of the present disclosure. As won in FIG. 10, when the ratio of the cathode active materials to the zirconia balls was 1:5, it was seen that a recovery rate of about 40% for 10 g/L and about 20% for 100 g/L can be achieved within about 4 hours.

The invention claimed is:

1. A method for extracting lithium from cathode active materials in spent lithium-ion batteries using a neutral aqueous solution, the method comprising the steps of:

grinding the cathode active materials of the spent lithium-ion batteries through a ball milling process by zirconia balls;

preparing the neutral aqueous solution, and then mixing the ground cathode active materials with the neutral aqueous solution; and generating lithium ions extracted from the neutral aqueous solution, wherein a concentration of the ground cathode active materials in the neutral aqueous solution is 0.15-0.25 g/L, wherein the neutral aqueous solution is ultra-pure water, and an average diameter of the zirconia balls is 2.5-3.5 mm, and wherein a lithium ion recovery rate is 80% or more immediately after the mixing step.

2. The method according to claim 1, wherein the mixing step is carried out at room temperature.

3. A method for extracting lithium from cathode active materials in spent lithium-ion batteries using a neutral aqueous solution, the method comprising the steps of:

grinding the cathode active materials of the spent lithium-ion batteries through a ball milling process by zirconia balls;

preparing the neutral aqueous solution, and then mixing the ground cathode active materials with the neutral aqueous solution; and generating lithium ions extracted from the neutral aqueous solution, wherein a concentration of the ground cathode active materials in the neutral aqueous solution is 0.15-0.25 g/L, wherein the neutral aqueous solution is a solution comprising peptone and yeast extract, and an average diameter of the zirconia balls is 0.8-3.2 mm, and wherein a lithium ion recovery rate is 70% or more immediately after the mixing step.

4. A method for extracting lithium from cathode active materials in spent lithium-ion batteries using a carbonic acid solution, the method comprising the steps of:

grinding the cathode active materials of the spent lithium-ion batteries through a ball milling process by zirconia balls;

preparing a carbonic acid solution, and then mixing the ground cathode active materials with the carbonic acid solution; and extracting lithium ions in the carbonic acid solution, wherein a concentration of the ground cathode active materials in the carbonic acid solution is 0.15-0.25 g/L, wherein an average diameter of the zirconia balls is 2.5-3.5 mm, and wherein a lithium ion recovery rate is 80% or more immediately after the mixing step.

5. The method according to claim 4, wherein a ratio of the cathode active materials to the zirconia balls is in the range of 1:5-35.

6. The method according to claim 4, wherein the carbonic acid solution is a 0.1-2M $NaHCO_3$ solution.

7. The method according to claim 4, wherein a recovery rate is about 100% in the extracting step.

8. A method for extracting lithium from cathode active materials in spent lithium-ion batteries using an aqueous solution and carbon dioxide, the method comprising the steps of:

grinding the cathode active materials of the spent lithium-ion batteries through a ball milling process by zirconia balls;

mixing the ground cathode active material with the aqueous solution, and then bubbling carbon dioxides in the aqueous solution; and extracting lithium ions in the aqueous solution, wherein a concentration of the ground cathode active material in the aqueous solution is 0.15-0.25 g/L, wherein an average diameter of the zirconia balls is 2.5-3.5 mm, and wherein a lithium ion recovery rate is 80% or more immediately after the bubbling step.

9. The method according to claim 8, wherein the aqueous solution is ultra-pure water.

10. The method according to claim 8, wherein a recovery rate is about 80% in the extracting step.

11. The method according to claim 8, wherein a ratio of the cathode active materials to the zirconia balls is in the range of 1:5-35.

* * * * *